US006594773B1

(12) United States Patent
Lisitsa et al.

(10) Patent No.: US 6,594,773 B1
(45) Date of Patent: Jul. 15, 2003

(54) ADAPTIVE CONTROL OF STREAMING DATA IN A GRAPH

(75) Inventors: Rafael S. Lisitsa, Bellevue, WA (US); George H. J. Shaw, Woodinville, WA (US); Dale A. Sather, Seattle, WA (US); Bryan A. Woodruff, North Bend, WA (US); Costin Hagiu, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/511,457

(22) Filed: Feb. 23, 2000

Related U.S. Application Data

(60) Provisional application No. 60/165,201, filed on Nov. 12, 1999.

(51) Int. Cl.[7] .............................. G06F 1/04; G06F 7/00
(52) U.S. Cl. ....................................... 713/600; 713/400
(58) Field of Search ................................ 713/400, 401, 713/600

(56) References Cited

U.S. PATENT DOCUMENTS

| | | | | |
|---|---|---|---|---|
| 5,815,689 A | * | 9/1998 | Shaw et al. | 713/400 |
| 5,825,430 A | * | 10/1998 | Adolph et al. | 348/487 |
| 6,086,628 A | * | 7/2000 | Dave et al. | 716/7 |
| 6,209,041 B1 | * | 3/2001 | Shaw et al. | 709/321 |
| 6,311,221 B1 | * | 10/2001 | Raz et al. | 709/231 |

FOREIGN PATENT DOCUMENTS

| | | |
|---|---|---|
| EP | 0 550 196 | 7/1993 |
| EP | 0 847 191 | 6/1998 |
| WO | WO 97 50242 | 12/1997 |

OTHER PUBLICATIONS

Connell, Edward V. et al.: "Combinative Interactions of a Human Immunodeficiency Virus (HIV) Tat Antagonist with HIV Reverse Transcriptase Inhibitors and a HIV Protease Inhibitor", Antimicrobial Agents and Chemotherapy, Feb. 1, 1994, pp. 348–352, XP 000654722.

Rubine, Dean et al.: "Low–Latency Interaction Through Choice–Points, Buffering, and Cuts in Tactus", Proceedings of the International Conference on Multimedia Computing and Systems, May 14–19, 1994, XP 000541903.

Horn, F.: "On Programming and Supporting Multimedia Object Synchronization", Computer Journal, Oxford University Press, vol. 36, No. 1, 1993, pp. 4–18, XP 000360261.

Rabvindran, K. and Bansal, Vivek: "Delay Compensation Protocols for Synchronization of Multimedia Data Streams", IEEE Transactions on Knowledge and Data Engineering, vol. 5, No. 4, Aug. 4, 1993, pp. 574–589, XP 002162224.

Data Flow in the Filter Graph, at www.microsoft.com/devonly/tech/amov1doc.amsdk107.htm (last visited Nov. 4, 1999).

About Filter Architecture, at www.microsoft.com/devonly/tech/amov1doc.amsdk102.htm (last visited Nov. 4, 1999).

Understanding Time and Clocks in DirectShow, at www.microsoft.com/DirectX/dxm/help/ds/appdev/understandingtime clocks.htm (last visited Nov. 3, 1999).

\* cited by examiner

Primary Examiner—Thomas M. Heckler
(74) Attorney, Agent, or Firm—Leydig, Voit & Mayer, Ltd.

(57) ABSTRACT

Frame based streaming data is controlled through a reconfigurable graph of processing modules. A client specifies overall goals for the graph. A graph manager constructs the graph as a sequence of interconnected modules for processing the data, in response to the capabilities of modules within the graph and the overall goals, and divides the graph into time domains each having one or more modules, pipes each having one or more modules, and a control mechanism is used that eliminates components unnecessary to the overall operation of the graph and that provides synchronization between time domains using time translation tables or timing correlation tables. The graph manager adaptively controls graphs that have a low latency requirement.

60 Claims, 8 Drawing Sheets

ADAPTIVE CONTROL OF STREAMING DATA IN A GRAPH

This application claims the benefit of Provisional application Ser. No. 60/165,201, filed Nov. 12, 1999.

TECHNICAL FIELD

This invention relates generally to electronic data processing, and, more particularly, relates to managing the flow of streaming data through multiple processing modules in a computer system.

BACKGROUND OF THE INVENTION

Continued advances in computer technology have lead to not only increased performance, but also increased performance expectations by the users of such computer equipment. The industry has responded with increased speed for CD ROM drives, communication modems, and faster video and audio cards. These increased user expectations extend not only to hardware capability, but also to the processing capability of data.

For example, in areas such as multimedia and audio compression, a technique known as streaming was developed for transferring data so that it can be processed as a steady and continuous stream. Digital samples representing an audio signal, for example, must be converted to a sound wave in the same sequence the samples were transmitted, and presented at the time spacing they were generated or at a user-specified alternative. Digital data representing video frames must be placed in the proper sequence in a frame and successive frames must be displayed at the correct real-time rate. Streaming technologies are becoming increasingly important with the growth of the Internet because most users do not have fast enough access to download large multimedia files quickly. Streaming data is also used in areas such as video conferencing, digital video discs (DVD), professional audio, telephony, and other areas where audio, video, or audio and video is digitally processed. With streaming, the data can start to be displayed before the entire file has been transmitted.

Streaming data does not need to maintain correct sequence or timing throughout an entire communication chain among the various transmitters, processors, memories, and receivers. For example, audio and video clips are frequently stored as static data in recording media, computer memories, and network buffers. Packet-switched systems might carry parts of the same streaming data over different paths and even in different time sequences. Processors such as digital filters can assemble parts of the data stream, modify them as a static unit, and then release them to other units in the system. However, the stream must be heard and/or seen in the correct sequence at the proper time.

Streaming data almost always requires some form of processing among various modules in a system. For example, a video clip might require MPEG decoding in a dedicated hardware module, rasterizing the video fields in another hardware module, digital filtering of the audio in a software module, insertion of subtitles by another software module, parsing audio data to skip silent periods by a software module, D/A conversion of the video in a video adapter card, and D/A conversion of the audio in a separate audio card. For streaming to work, the data must be processed as a steady stream and then rendered to audio and/or video. If the data isn't processed quickly enough, however, the presentation of the data will not be smooth.

The concept of a graph was introduced for specifying the connections among the modules that a data stream must pass through for processing in an efficient manner in an effort to increase the data processing speed. Protocols such as WDM-CSA (Windows Driver Model Connection and Streaming Architecture) were developed to specify the flow of data frames through a graph and to specify the control protocol that adjacent modules in the graph use to communicate with each other to request and accept the frames. During connection of modules in a graph, these protocols define a predefined fixed sequence of data flow and control connection negotiations in a graph. A typical negotiation sequence is to negotiate the following in order: the interface, the medium, the data format, the allocators, and the master clock. These architectures have been used to improve the actual data flow only to the extent of reducing inter-buffer data transfers between adjacent modules in the graph.

The simplest and fastest method of controlling the data in a graph is a dedicated protocol for transporting data in frames using a hard-wired, unchanging configuration of modules. Current solutions typically use fixed, hard coded parameters without having a clear concept of the whole graph. For example, some mixer modules are hard coded to have a different size frame buffer depending on the hardware configuration of the system. Additionally, some capture modules will select the number of buffers based on the hardware configuration. At the other extreme, a one-size-fits-all protocol capable of handling a broad spectrum of data types and formats and a wide range of modules has been used. While this protocol is very flexible, and works with a variety of data types, including streaming data, the flexibility almost always sacrifices speed leading often to redundancy and lower efficiency in many graphs.

These architectures and solutions have significant limitations and are not practical for environments such as a multimedia system or personal computer capable of receiving many different kinds of streaming data in multiple formats, and where many manufacturers provide individual modules. One limitation in these systems is that a graph can only have a single clock. For a graph to have a single clock, every other clock in the graph must be able to slave to the single clock. For example, in a relatively simple audio-video graph, the audio-video capture module has its own clock and the audio renderer module has its own clock. For this graph to work, either the capture module or renderer module has to have the capability to rate match its clock to the other module's clock. If no module in the system has the capability to rate match, then the graph would not work in these systems. These architectures and solutions also do not have the capability to define and solve complex graph timing issues in a graph-wide context and generally do not consider the stream latencies in a graph.

Commonly assigned patent application Ser. No. 09/310,610 "Improving the Flow of Streaming Data through Multiple Processing Units," filed May 12, 1999, provides a partial solution to these limitations by introducing the concept of data pipes for enhancing the data flow of streaming-data frames through a graph of interconnected modules in streaming-data environments. The data pipes avoid redundant storage and copying of data as a number of modules process the data frames, and streamline allocation of the frames in which the data is packaged. Another commonly assigned patent application, Ser. No. 09/310,597, "Improving the Control of Streaming Data through Multiple. Processors," filed May 11, 1999, presents a mechanism for controlling the flow of frames through multiple modules by improving the control from a graph-wide perspective, rather than optimizing each individual module separately. Any control component in the graph that is unnecessary to the overall operation of the graph is removed and the remaining components are then connected directly to each other. Commonly assigned application Ser. No. 09/310,596 "Efficient Splitting and Mixing of Streaming-Data Frames for Processing Through Multiple Processor Modules", filed May 11, 1999, presents a mechanism for splitting a single frame of streaming data into multiple frames and for combining, merging, or mixing multiple streaming data frames into a single frame. These applications, hereby incorporated by reference, provide partial solutions for increasing efficiencies in processing streaming data to overcome some of the aforementioned limitations.

Accordingly, there therefore exists a continued need for further efficiencies in processing streaming and related types of data in a graph by providing a control mechanism that increases the overall speed of data flowing through the graph, that reduces the systems resources usage, that synchronizes multiple clocks present in a graph, that adaptively controls graphs to achieve low latency graphs, and that achieves the efficiency of a dedicated protocol while allowing enough flexibility of different data types, different modules, and different configurations in the environment of streaming data through multiple processing modules.

SUMMARY OF THE INVENTION

In view of the above described problems existing in the art, the present invention provides a system that provides timing and synchronization of streaming data flowing through a graph having multiple modules and having multiple clocks. The system provides a mechanism for splitting the graph into time domains rather than converting all data streams that need to be synchronized into a single master clock that provides the rate of data to the entire graph. A time domain is a set of connections (or pins) in the graph that correspond to the data streams, whose data samples' time stamps correspond to a common clock. This common clock is called a time domain clock. The system provides an explicit understanding of the relationship between the rates of the clocks in different time domains and constructs a graph that has modules that can span the boundaries between time domains.

Another aspect of the invention is using the explicit understanding of the signal time at different positions in the data streams to control data propagation so that a graph's latency is at a minimum without a module in the graph running out of data. A further aspect detects when there is a potential for the graph to underrun and dynamically takes corrective action to prevent the graph from running out of data.

In another aspect of the invention, the system analyzes the graph requirements and individual module properties. Using the interdependent concepts of data flow, control, and timing and synchronization an acceptable solution for the pipe configuration, the time domain configuration, and the flow control configuration is derived where solutions exist. Once a solution is determined, the system translates the solution into requirements for the individual modules and streaming framework modules of the graph.

Additional features and advantages of the invention will be made apparent from the following detailed description of illustrative embodiments that proceeds with reference to the accompanying figures.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION OF THE INVENTION

Figure 1:
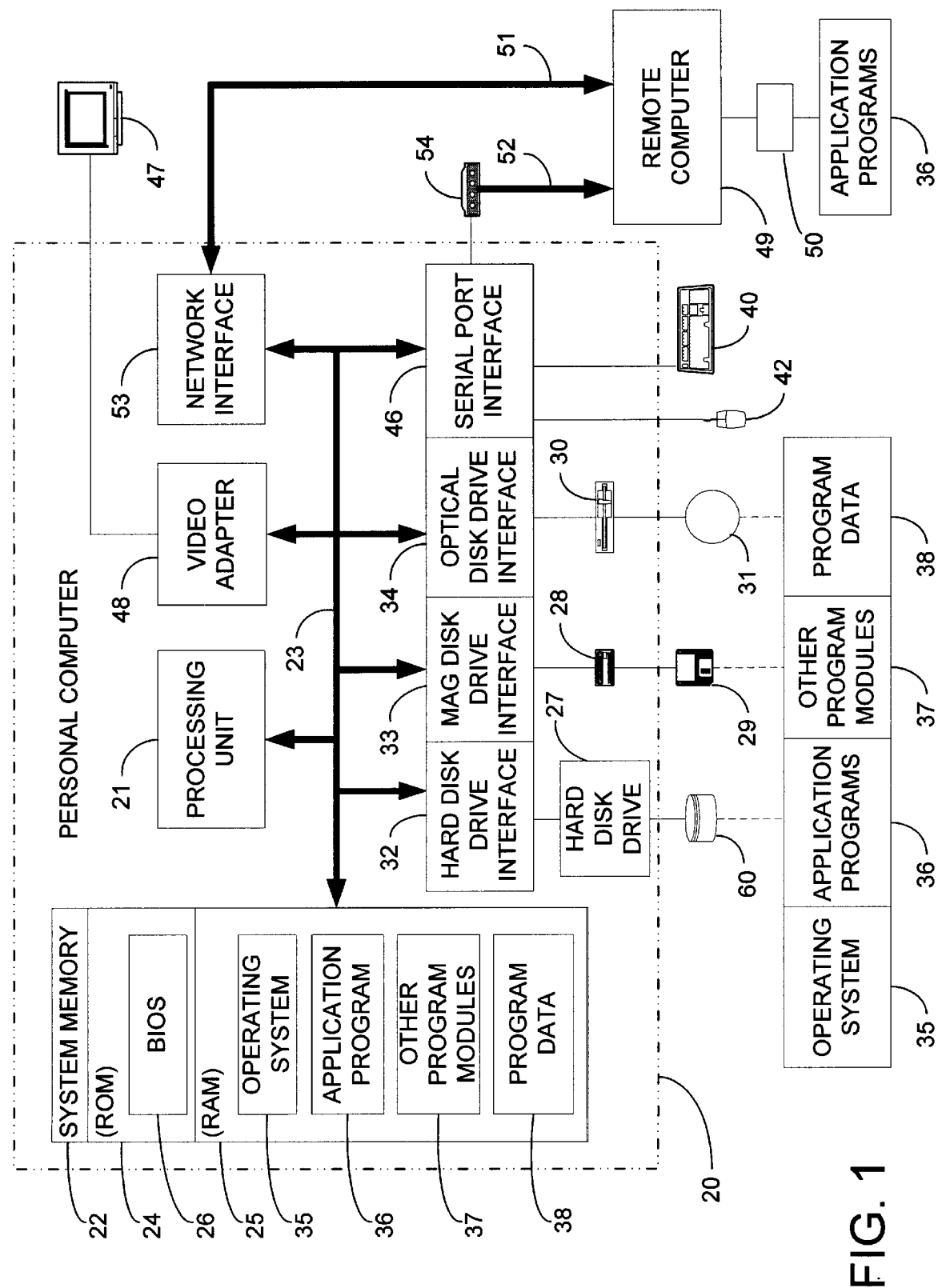
FIG. 1 is a block diagram generally illustrating an exemplary computer system on which the present invention may reside.

Turning to the drawings, wherein like reference numerals refer to like elements, the invention is illustrated as being implemented in a suitable computing environment. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system (BIOS) 26, containing the basic routines that help to transfer information between elements within the personal computer 20, such as during start-up, is stored in ROM 24. The personal computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer readable instructions, data structures, program modules and other data for the personal computer 20. Although the exemplary environment described herein employs a hard disk, a removable magnetic disk 29, and a removable optical disk 31, it will be appreciated by those skilled in the art that other types of computer readable media which can store data that is accessible by a computer, such as magnetic cassettes, flash memory cards, digital video disks, Bernoulli cartridges, random access memories, read only memories, and the like may also be used in the exemplary operating environment.

A number of program modules may be stored on the hard disk, magnetic disk 29, optical disk 31, ROM 24 or RAM 25, including an operating system 35, one or more applications programs 36, other program modules 37, and program data 38. A user may enter commands and information into the personal computer 20 through input devices such as a keyboard 40 and a pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port or a universal serial bus (USB). A monitor 47 or other type of display device is also connected to the system bus 23 via an interface, such as a video adapter 48. In addition to the monitor, personal computers typically include other peripheral output devices, not shown, such as speakers and printers.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the local network 51 through a network interface or adapter 53. When used in a WAN networking environment, the personal computer 20 typically includes a modem 54 or other means for establishing communications over the WAN 52. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

In the description that follows, the invention will be described with reference to acts and symbolic representations of operations that are performed by one or more computer, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that various of the acts and operation described hereinafter may also be implemented in hardware.

Figure 2:
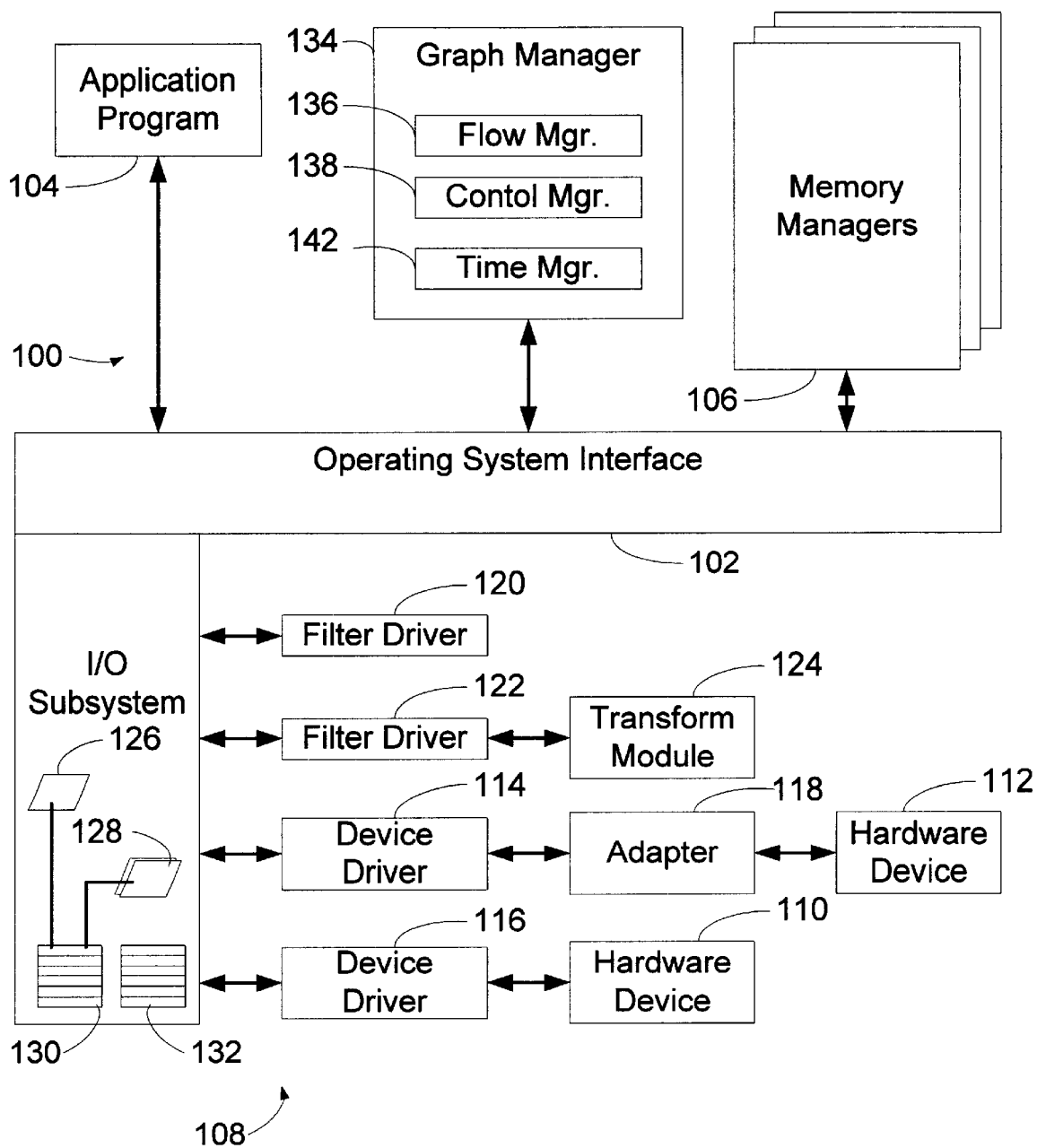
FIG. 2 shows relevant portions of an exemplary operating system for hosting the invention.

FIG. 2 shows the relevant components of an illustrative operating system 100 in which the invention operates. Interface component 102 communicates with other components and with software such as application programs 104 outside the operating system. Application program 104 might be, for example, a viewer utility by which a user selects certain streaming data for presentation.

System memory 22, FIG. 1, has memory manager components 106 for organizing the data stored in it. For example, an allocator might specify frame size, data type, and other characteristics of the data stored in a memory module in the system memory 22. A single physical memory module can have multiple memory managers for organizing different data at different times or in different parts of the module. A single memory manager can also serve multiple physical memories. The significant function of managers 106 in the present context is to allocate and deallocate blocks of memory for storing frames or other units of streaming data. For this reason, managers 106 will frequently be referred to as memory allocators. A frame is allocated whenever newly arriving data requests it, or it can be pre-allocated. The frame carries the data through one or more filters in a path, and is deallocated when all filters in the path have finished processing that data. Frames can be destroyed, but are usually recycled with further new data arriving in the path.

In the illustrative operating system, an I/O subsystem 108 supervises both file storage and other input/output devices and facilities. Requests for file or I/O services are routed between an application program or other source and hardware devices such as 110 and 112 via one or more layers of device drivers such as 114 and 116. Device 110 might be a hardware module such as a memory or an MPEG-2 decoder. Device 112 might represent an off-line storage device such as a DVD player or a cable TV, with its hardware interface adapter 118. Filter drivers such as 120 and 122 can intercept data, file handles, and other information, based upon certain characteristics or events. Filter drivers can also process data internally as shown at 120. They can also pass information back and forth to programs such as 124, which can be located within the operating system kernel layer or at any other point in the software architecture of system 20. Components can be dedicated to a single function, or, more often, can be programmed to carry out multiple functions, either sequentially or concurrently. A digital signal processor, for example, can execute many different functions such as frequency filtering, gain change, and acoustic effects.

I/O manager 108 controls the flow of information, symbolized at 126 and 128, with stacks 130 and 132 of control packets each associated with different items of information, or with packages for those items. Each packet, called an I/O request packet (IRP) is an entry in one of the stacks. I/O manager 108 executes them at the appropriate times for transporting the data or other information among the attached drivers, programs, and hardware devices. A control packet is like a job order directing a module to perform a specified task upon designated data frames.

Graph manager 134 of the instant invention implements the subsystem that builds and manages graphs for streaming data. The data-flow manager described in the aforementioned patent application Ser. No. 09/310,610 is represented at 136. Block 136 constructs or configures a graph as required for a particular streaming-data application, and causes subsystem 108 to play the graph—that is, to transport data through it—when requested. The individual modules of a graph can comprise any of the devices or programs in FIG. 2, or other types of hardware or software. Block 136 also includes the pipe manager described in the aforementioned patent application Ser. No. 09/310,596. The pipe manager provides the capability to combine, merge, or mix multiple data frames of streaming data into a single data frame and to split a single data frame of streaming data into multiple data frames. Block 138 represents the control manager described in the aforementioned patent application Ser. No. 09/310, 597. This block may employ IRPs, sometimes referred to more generically as control packets, for controlling the transport of streaming-data frames through the modules of the graph. Control manager 138 optimizes the stacks 130, 132 for controlling streaming data. Block 142 represents the timing and synchronization manager of the present invention. It should be appreciated blocks 136, 138, 142 are shown separately for clarity and these blocks may be integrated into a single block.

Figure 3:
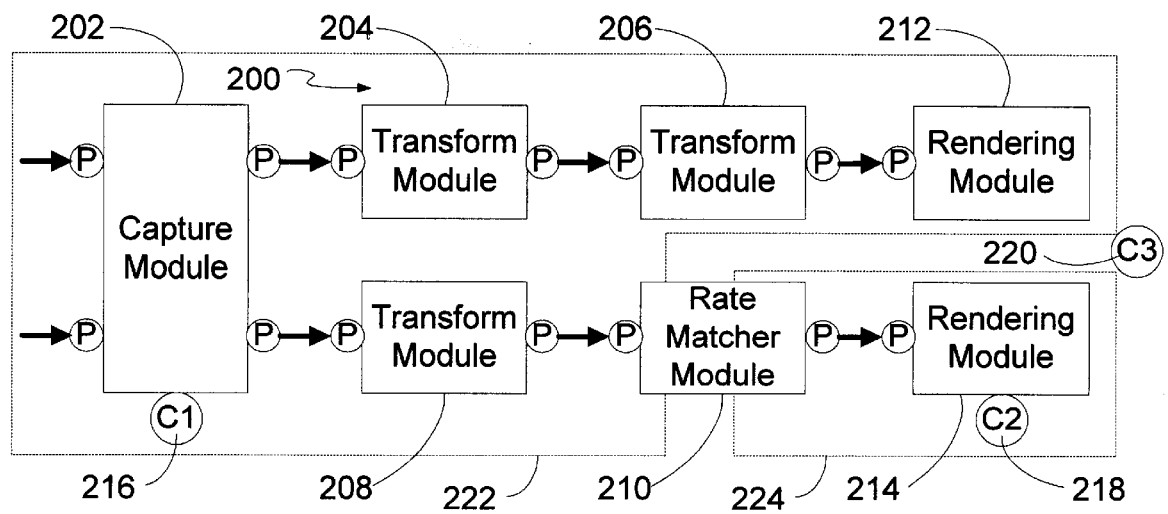
FIG. 3 is a block diagram of an example of a streaming data graph having two time domains.

FIG. 3 is an example of a streaming-data graph 200. Pipe 200 has seven modules. Capture module 202 illustrates the sourcing of streaming data, e.g., from a modem, a disk drive, or from sampling a live data stream, and stands at the beginning of the graph. Transform modules 204, 206, 208, 210 in the pipe demonstrate functions that convert data from one form to another, such as an MPEG decoder. Module 212, shown as a function for rendering video data, is located at the end of the graph. Module 214, shown as a function for rendering audio data, also is located at the end of the graph. In the embodiment of FIG. 3, modules transfer data to each other by means of logical pins, labeled P. Pins are communication endpoints that can send or receive or send and receive data. The arrows signify transfer of data among different modules.

In many graphs, data streams being rendered must be rendered at a certain time or at a certain rate, within some specified tolerance. This is defined as synchronization. For example, every input pin in any capturing module of a graph is associated with a clock, represented by clock 216 in FIG. 3. It should be appreciated that each input pin may be associated with a separate clock. Audio renderers, such as rendering module 214, play audio data based on their own clock, represented by clock 218. The data stream being rendered by the video renderer 212 in FIG. 3 must be presented in synchronization with the data stream being rendered by audio renderer 214 during audio/video playing. In other situations, the data stream being rendered by audio renderer 214 must be rendered relative to a predetermined time, with some specified tolerance, relative to a specified clock.

Synchronizing two or more data streams in a graph requires defining when, where, and how the data identified to be synchronized is presented. This requires that the input data be identified, the synchronization points in a graph be selected, and the synchronization method be selected. The synchronization points in a graph can be any point in the graph, but are generally selected to be the rendering pins of the graph. For example, the synchronization points could be points where the data in multiple streams is mixed in some fashion. The synchronization method is the binding chosen between input signals, output signals, and time. For example, in the illustrative embodiment shown in FIG. 3, the input audio and video data may be captured based on clock 216 by capture module 202. The corresponding video and audio data at the output pins of capture module 202 are time stamped based on clock 216, indicating that the audio and video data are identified based on clock 216 time stamps. The synchronization points selected are the audio renderer's output pins and the video renderer's output pins. The synchronization method selected is slaving the video stream presentation, e.g., the video renderer output, to the audio presentation based on the audio stream presentation clock 220. In order to have a better understanding of the timing and synchronization aspect of the invention, the inventive concepts of a signal clock, signal time, time domain, time translation table, time correlation table, and queue time need to be explained and understood.

Input data can be identified through a data stream's timing information. Some data streams carry timing information, some data streams implicitly carry timing information, and some streams do not carry timing information. For example, multimedia files may store the relative intended presentation time with the data. Television broadcast signals generally do not carry explicit timing information, but a television tuner's clock provides implicit timing information about the incoming signal since the tuner's clock must be synchronized with the remote broadcasting station's clock in order to capture the data.

A signal clock is a clock that can best represent a data stream's timing information and the clock's frequency generally closely approximates original signal sampling frequency. Generally, the signal clock is the closest clock to the original signal capturing location. In simple cases such as reading data from multimedia files, the original sampling signal clock is not available, so the signal clock can be any accessible hardware clock to provide the time reference.

If the input data is a live signal, there is always a clock that can best describe the streaming timing information and that clock is the signal clock. For example, when an analog waveform is first sampled in order to convert the waveform into a digital waveform, the capturing module clock is used to control the data sampling time. The capturing module clock is the signal clock.

For remote live capture and local live rendering, the capturing module is located on a different machine, and it captures and time stamps the data based on its own remote clock. The rendering module located on the local machine renders the data based on its own local clock. The stream needs to be rate-matched somewhere between the remote capture and local render to compensate for the remote clock and local clock drift. In most cases, the rate matching needs to be done at the machine performing the rendering. However, the local machine may not have access to the remote clock. Another complication is that most networks introduce a certain amount of jitter, so it may not be acceptable to use the timestamp of the incoming data frame as the remote clock time reference. In one embodiment, these problems are solved by having the local capture module use a local clock as the signal clock that is conceptually a proxy for the remote clock. The signal clock can expose both the progression of the signal coming from the remote source module (e.g., a presentation time), and the progression of a time at the remote source clock (e.g., a physical time). The local clock presentation time can be defined based on the time stamp of the last frame received from the remote side.

Figure 4:
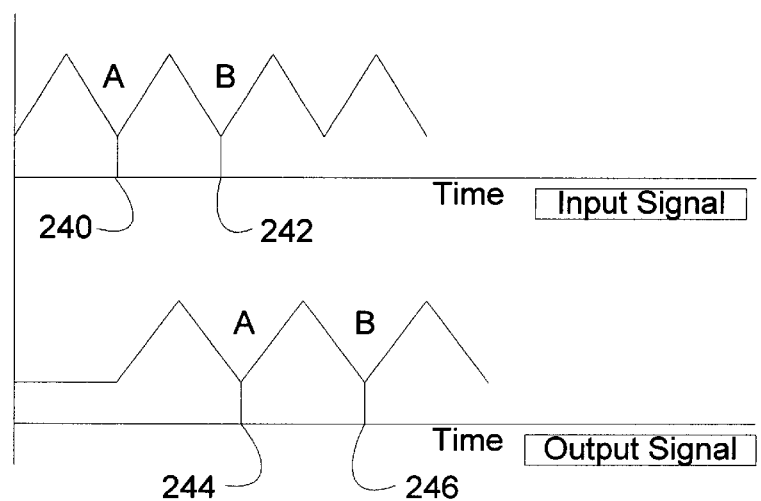
FIG. 4 illustrates the concept of signal time.

Now that the concept of a signal clock has been explained, signal time will now be explained. Many graphs, in addition to requiring data streams to be synchronized, also require rendering data streams relative to a timeline. For example, many multimedia data streams are intended to be rendered relative to some timeline. Audio needs to be played at a particular frequency and video needs to be refreshed at a certain frequency. In these graphs, the presentation of a data stream's samples relate to a certain time. This time, signal time, is the intended time of the presentation of a data sample in a data stream relative to the signal clock. Conceptually, this is shown in FIG. 4. For clarity, FIG. 4 shows a continuous signal. It should be noted that an analog input signal is sampled at a certain frequency in the conversion to a digital signal, so an actual chart would show discrete points in the graph. FIG. 4 shows the time positions of input samples A and B at 240 and 242 respectively. FIG. 4 also shows the time positions of the corresponding output signals A' and B' at 244 and 246 respectively. The signal time for sample A in FIG. 4 is at point 240. The corresponding signal time of the output signal for sample A is at point 244. The signal time for sample B in FIG. 4 is at point 242. The corresponding signal time of the output signal for sample B is at point 246.

Now that the concept of signal time has been explained, the concept of a time domain will now be explained. Where there are two or more clocks present in a data stream, the potential exists for drift between the clocks. If the drift between clock 216 (FIG. 3) that controls the capturing of the audio stream and clock 218 that controls the rendering of the audio stream builds up and is not corrected, the audio stream will underrun or overrun and the audio and video will not be synchronized. To prevent this from occurring, a rate-matching module 210 is inserted in the audio path. The rate-matching module 210 changes the amount of output audio samples compared to the amount of input audio samples in order for the graph to take the same amount of time to input and to output the same amount of signal. Note that if either the capture module 202 or the audio renderer 214 can do rate matching, then the rate matching module 210 is not needed in the graph.

The insertion of the rate-matcher module 210 results in dividing the entire audio stream path into two time domains. A time domain is a set of pins (or connections) that correspond to the data streams, whose data samples' time corresponds to a common clock. Using the rules of an embodiment discussed below, the first time domain 222 also includes the entire video path and the second time domain 224 consists of the audio renderer module 214 and the output pin of the rate matcher module 210.

There are many ways that a graph can be divided into time domains. In one embodiment, the starting points for time domains, if any, are established. If there is no pin in the graph that exposes a clock, the graph is free-running and no time domain computations need to be performed. Otherwise, in one embodiment, the following rules are applied to generate time domains:
1. Two pins belonging to same module are considered to be independent when the underlying module is able to rate match the streams passing through those two pins.
2. If a pin A exposes a clock C1, then pin A belongs to a time domain T1 defined by the clock C1.
3. In the context of a given module, if a pin A belongs to a time domain T1, then another pin B that cannot be independent of A also belongs to the time domain T1.
4. If a pin B is connected to a pin A belonging to time domain T1 and pin B does not belong to any time domain, then pin B also belongs to time domain T1.
5. If a pin B is connected to a pin A belonging to time domain T1 having clock C1 and pin B belongs to a different time domain T2 having clock C2, then if either one of the pins exposing clocks C1 and C2 can slave to the other clock, then time domains T1 and T2 will be merged into a single time domain defined by the clock assigned as a master clock. Otherwise, a rate matcher module can be inserted between those two pins to properly join the time domains or the graph will not be able to avoid underrun/overrun conditions at runtime.
6. If there are still pins that have not been assigned to a time domain, a pin may be assigned to a time domain according to the following: In the context of a given module, if a pin A belongs to a time domain T1, then any other pin B that can be independent of A and that does not already belong to a time domain may also belong to time domain T1.

This embodiment is able to deal with multiple clocks in a graph without forcing all modules to slave to a single clock and offers a general solution when the graph endpoint modules are not able to adjust their own clock rate with the use of a rate matcher module. Other algorithms may also be used to divide a graph into time domains provided that the constraints of each pin only being in exactly one time domain and no two pins that must use distinct clocks being in the same time domain are met.

Figure 5:
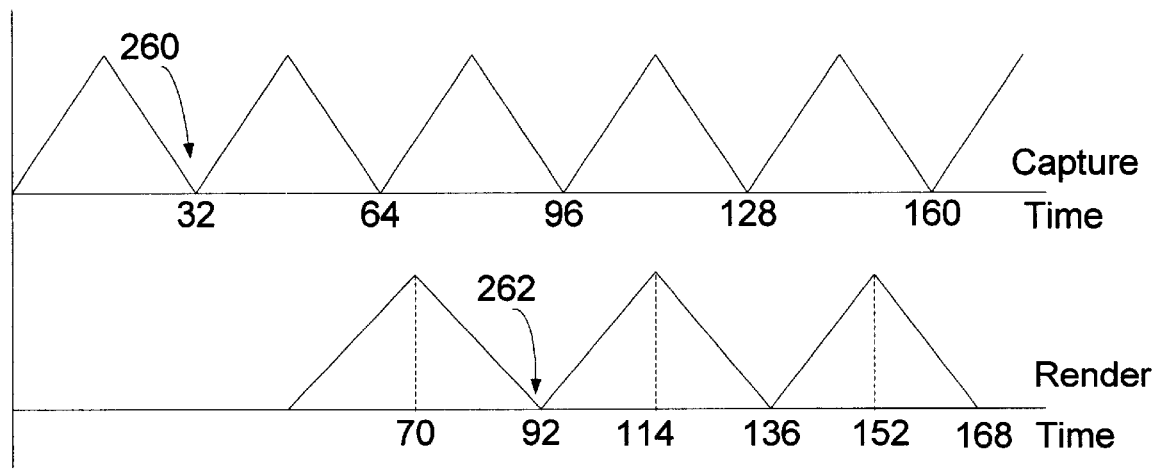
FIG. 5 illustrates time drift between two clocks in a graph.

Time domains are directly related to the signal time defined above. In the graph of FIG. 3, it may take a different amount of time to capture and to render the same amount of signal, because the capturing and rendering rates are controlled by different clocks. For purposes of explanation, assume clock 218 runs at 8 kHz, clock 216 runs at 11 kHz, the audio frame size is 32 ms, and rate matching is not applied during the propagation of the first two frames. Clock 218 has a very significant drift relative to clock 216. For the same amount of signal (32 ms of clock 216 time), it will take 32 ms of clock 216 time to input it and 32* 11/8=44 ms of clock 216 time to output it. FIG. 5 shows this using a continuous signal for clarity. The capture module 202 outputs the signal at time 260 and the renderer module 214 outputs the signal at time 262. It should be noted that the Render Time in FIG. 5 shows the entire propagation delay through the graph.

It should be noted that using time domains and modules that can bridge each time domain, data can be streamed through a graph at different rates than the renderer can render the data. This is analogous to Fast Forward and Fast Reverse functions. In such a graph, the capture module clock 216 is a function of renderer module clock 218. This concept can be extended to include a "live" input signal and buffering for the corresponding data stream such that random access within the data stream is allowed up to the current "live" feed position. Clock 216 would be a function of clock 218 at times and at other times, be limited by the actual incoming data rate.

Now that the concept of a time domain has been explained, the concept of a translation table will now be explained. As previously noted, a rate-matcher changes the amount of output samples compared to the amount of input samples in order for the graph to take the same amount of time to input and to output the same amount of signal. When the rate matcher does change the amount of output samples, the time stamps, which are located in stream headers, are affected. The time stamps do not properly indicate the relationship between the data samples after the rate matcher with respect to the data samples prior to the rate matcher because of the change in the amount of output samples. A translation table is used to indicate the relationship between clocks in different time domains that enables data to be tracked between time domains. With knowledge of the relationship between clocks in different time domains (e.g., a translation table) and knowledge of the current progression of a clock in one time domain, a clock in another time domain can be derived. Table 1 shows an embodiment of a translation table for the graph of FIG. 3.

polling and notifications. The presentation time of the presentation clock 220 is the time stamp of the currently rendered data sample. To synchronize data streams, one stream is selected as a master stream, and the master stream's renderer exposes the presentation time. Based on polling or notifications, each of the other streams to be synchronized are slaved to the master stream by having each of the other stream's renderer control the presentation rate of its stream to match the presentation rate of the master stream.

In polling, a client can ask the presentation clock 220 for the time. The presentation clock's handler reads the rendering clock 218, finds the beginning of the corresponding presentation clock 220 segment, the rendering clock 218 segment, the rate matching ratio, and derives the time. For example, if clock 218 time is 123 ms, the beginning of the

| C1 | Time Stamp before RM | Rate Matching Ratio | C2 | Time Stamp after RM | C3 | ΔC1 at Renderer |
|---|---|---|---|---|---|---|
| [0,32] | 0L32 | 1:1 | [0,32] | 0L32 | [0,32] | [0,44] |
| [32,64] | 32L32 | 1:1 | [32,64] | 32L32 | [32,64] | [44,88] |
| [64,96] | 64L32 | 3:4 | [64,88] | 64L24 | [64,96] | [88,120] |
| [96,128] | 96L32 | 3:4 | [88,112] | 88L24 | [96,128] | [120,152] |
| [128,160] | 128L32 | 3:4 | [112,136] | 112L24 | [128,160] | [152,184] |

Each row in table 1 corresponds to a single data frame's propagation in a data stream, starting with the first data frame. It should be noted that the entries in the time translation table do not have to align with data frame boundaries. New entries need to be added only when the effective rate-matching ratio has been changed.

The first column (C1) shows the time segment of the current data frame in clock 216 time. Since every data frame has 32 ms worth of input data, the first data frame is designated as [0,32] ms, the second data frame is designated as [32,64] ms, the third data frame is designated as [64,96] ms, the fourth data frame is designated as [96,128] ms, and the fifth data frame is designated as [128,164] ms. This identifies the data. For example, [96,128] ms indicates that the data within that frame is data for the time between 96 ms and 128 ms.

The second column (Time Stamp before RM) shows the time stamps range of the current data frame with the notation < StartTime> Length< Duration> prior to the rate matcher changing the amount of samples. For example, the first data frame 0L32 means 32 ms of data starting at zero time and the fifth data frame 128L32 means 32 ms of data starting at a time of 128 ms.

The third column is the rate matching ratio. Note that in this example, rate matching was not applied to the first two data frames because there was no knowledge about the drift between clock 216 and clock 218 yet.

The fourth column is the expected progression of clock 218, based on a known number of data samples and the rate matching ratio. The fifth column is the time stamp range of the current data frame after the rate matcher has changed the amount of samples. Note that this is consistent with the number of data samples in the frame and it is consistent with the time domain 224 (associated with clock 218) that is immediately after the rate-matcher module in the audio path.

The sixth column is the presentation clock 220, transparently built on top of clock 218 and the translation table. Clock 220 reports time in clock 215 time domain. The presentation clock can be used primarily in two ways:

corresponding presentation clock 220 segment is 128 ms, the rendering clock 218 segment beginning is 112 ms, and the rate matching ratio is 3:4. The time in presentation time is equal to 128+(123−112)*(4/3)=143 ms.

In notification, the client asks that it be notified when the presentation time reaches a certain time. For example, a client requests that it be notified when the presentation time reaches 160 ms. Using the approach described above, the presentation clock's handler computes that corresponding rendering clock 218 time is 136 ms, so it sets the notification on rendering clock 218 to indicate when the time reaches 136 ms. In the event the client asks to be notified about a presentation time that is beyond the last time translation table entry, the presentation clock's handler simply stores this request and processes it when new entries are added.

The last column, ΔC1 at Renderer, is the amount of time in clock 216 units that it took to render the current frame and is the increment of the amount of input signal measured in clock 216 units. ΔC3 is the increment of the amount of output signal measured in clock 216 units. The progression rate of the presentation clock 220 is different from clock 216 progression rate. For example a ΔC3 increment of 32 ms corresponds to a ΔC1 increment of 44 ms at the beginning of Table 1. This means that while it took 32 ms of clock 216 time (ΔC3) to input 32 ms of input signal, it took 44 ms of clock 216 time (ΔC1 at Renderer) to render the same amount of signal.

Now that the concept of a translation table has been explained, time correlation tables will now be explained. A clock's time correlation table, analogous to the time translation table, is used to convert a data stream's timestamp from one time domain into a timestamp of another domain. In one embodiment, one of the time domains is chosen as a master time domain and the other time domains are slaved to the master time domain. The time correlation table, as a minimum, holds corresponding values for the time of the master time domain clock and the slave time domain clock with a predefined granularity. The time correlation table can be used at points in the graph to convert the data streams' timestamps from the slave time domain to the master time domain by a specialized module or any other module capable of performing the conversion.

For example, in the graph of FIG. 3, capture module 202 may be split into two independent capture filters—an audio capture filter and a video capture filter—with each capture filter having its own clock. The resulting audio stream and video stream are time stamped based on different clocks. The audio stream is time stamped based on the audio capture filter clock and the video stream is time stamped based on the video capture filter clock. Video rendering module 212 may be slaved to the video capture filter clock and audio rendering module 214 may be slaved to the audio capture filter clock, eliminating the need for the rate matcher module 210. In one embodiment, the intended synchronization method is to have the video rendering module 214 slave to the audio rendering module's presentation clock, with the presentation time of the audio rendering module 214 being the time stamp of the currently rendered audio sample. A time correlation table between the audio capture filter clock and the video capture filter clock is used. This table's entries contain values of time read from the audio and video capture filter clocks at very close moments in time, preferably simultaneously within a predefined tolerance. Based on the time correlation table, the time stamp of the related video sample is computed. This correlated time, in video capture clock time domain, is exposed by the presentation clock built on top of the audio rendering module clock and the correlation table.

It should be noted that there are methods other than time correlation tables that can be used to synchronize data streams. In an alternative embodiment, all the streams that need to be synchronized are converted to a master time domain. This can involve signal re-sampling in order to keep the number of samples in synch with the master time domain clock's progression. Time offset adjustments may be required if the data stream was started using a clock with a different start time. It should be appreciated that re-sampling will generally add unwanted noise to the signal and that the earlier the re-sampling is performed, the more likely the noise will be amplified during subsequent data processing by the modules.

In another alternative embodiment of synchronization, no explicit synchronization is required between time domains and no master time domain needs to be selected if propagation latencies of data streams through a graph is within the admissible synchronization tolerance. Additionally, no time domain conversions are required. If there is implicit synchronization in the graph, then no explicit synchronization is required between time domains, no master time domain needs to be selected, and no time domain conversions are required. One example of implicit synchronization is having audio and video packets sequenced at a network transport provider based upon the order of the packets arrival.

Figure 6:
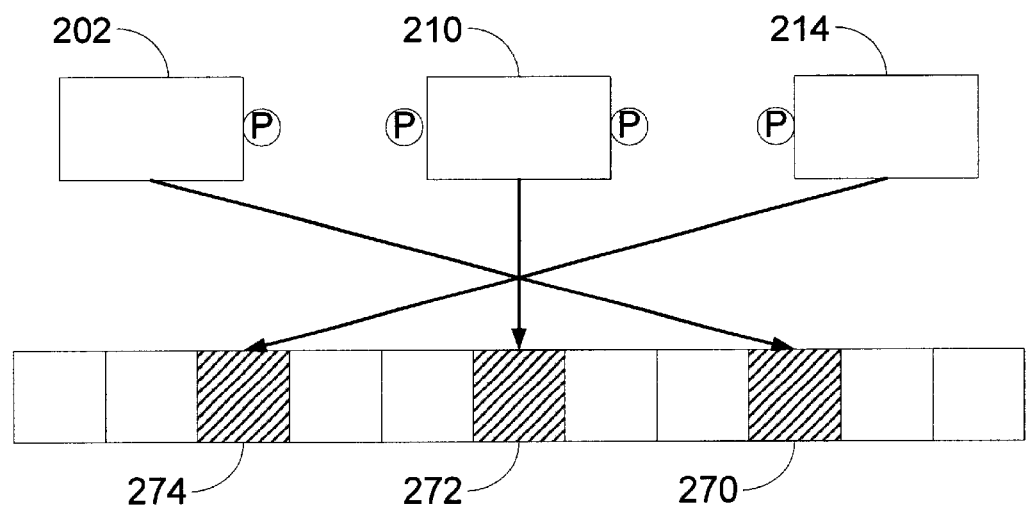
FIG. 6 illustrates the concept of streaming queue time.

Now that the concept of a time correlation table has been explained, queue times will now be explained. To dynamically track the propagation of streaming data, queue times are used. A queue time is conceptually the same as presentation time at a renderer module, but expressed in the time range of the data frames that modules in a time domain are currently processing. The time range of the data frames that are currently being processed in a time domain are translated into signal time units using the time translation tables. This is conceptually shown in FIG. 6 using a subset of the graph of FIG. 3. The input queue time of capture module 202 may indicate 128L32 meaning that the capture module 202 is working on segment [128,160] ms of correlated signal time indicated by 270 in FIG. 6. At the same moment, the input queue of rate matcher 210 may indicate 62L32 meaning that the rate matcher 210 is working on segment [64,96] ms of correlated signal time indicated by 272. The input queue of audio renderer 214 may indicate 32L32 meaning that the audio renderer 214 is working on segment [32,64] ms of correlated signal time indicated at 274.

Now that the inventive concepts of a signal clock, signal time, time domain, time translation table, time correlation table, and queue time are understood, further aspects of the invention can now be described. As previously indicated, graph manager 134 (FIG. 2) builds and manages graphs for streaming data. The time manager 142 of the graph manager 134 provides the timing and synchronization control of a graph using the concepts described above. The timing and synchronization control in conjunction with the flow manager 136 and control manager 138 of graph manager 134 monitors and controls certain events that are directly related to the general streaming processing in a graph including start/stop events for data frame processing, detecting and taking corrective actions when a data stream underflow or overflow is occurring or is about to occur, keeping track of clocks in a graph, computing rate matching ratios, correlating different clocks, building time translation tables, determining the availability of the desired events and the functionality of streaming modules, and adaptively controlling a graph to achieve graph specific goals such as low latency, low overhead, rate matching and isochronous connections. Time manager 142 also configures individual modules to do time stamping with a provided clock, to do rate matching with provided ratios and to render data with a provided clock.

To achieve low latency graphs, prior art systems hard code the modules to process data streams using certain frame sizes. Some modules even have a compile-time switch to reconfigure data frame sizes. Graph manager 134 adaptively controls the data frame sizes to stay within the latency requirements and also minimizes the overhead associated with transporting data.

Figure 7:
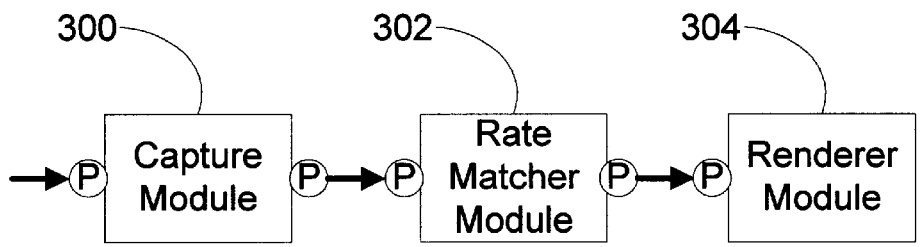
FIG. 7 is a block diagram of a graph having a low latency requirement and the dynamic adjustment of data frame sizes to achieve low latency throughput of streaming data.
Figure 7:
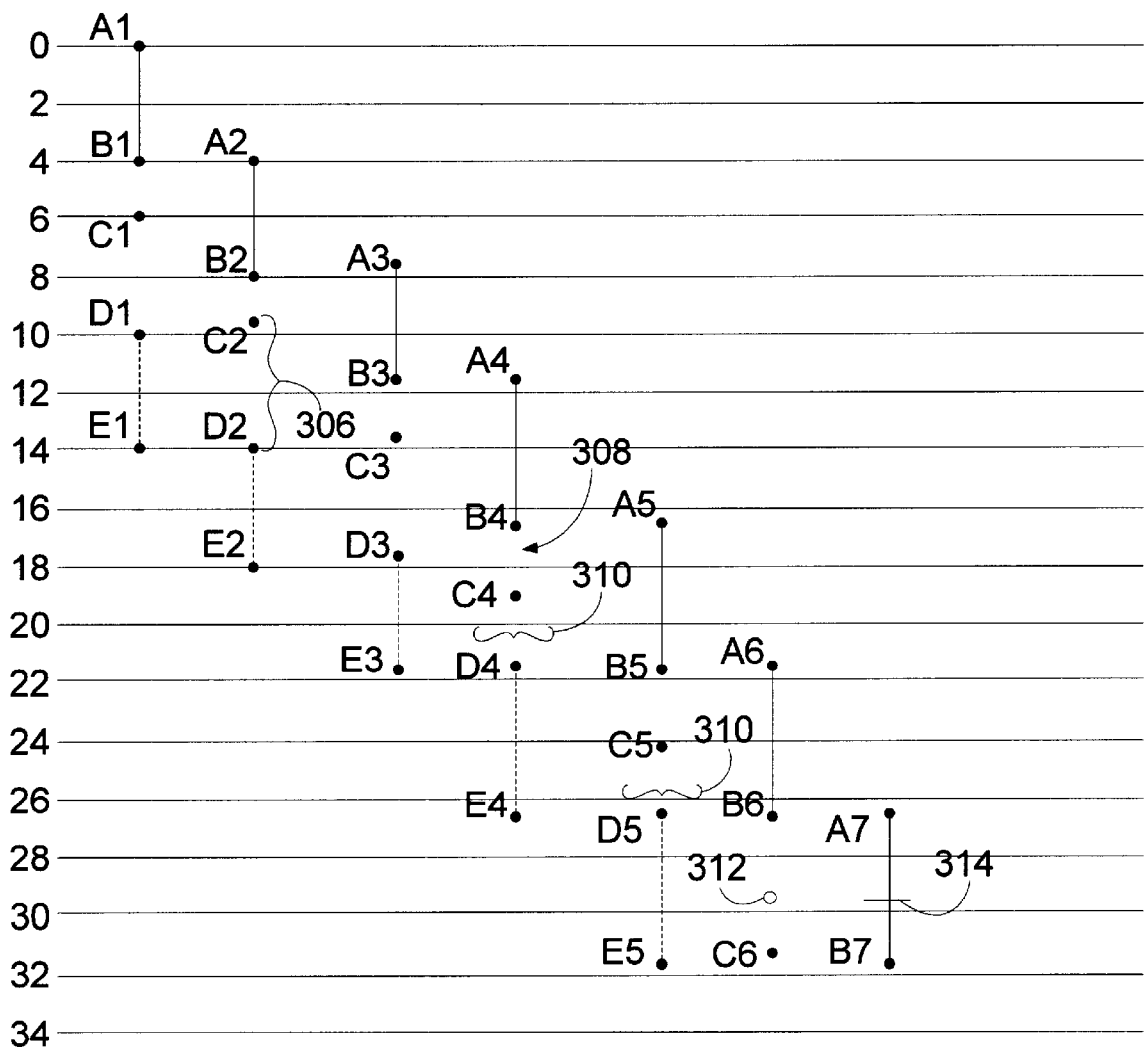

In one embodiment, graph manager 134 achieves a low latency graph by initially running the graph using a relatively small frame size to ensure that a sufficient reserve is available. Assuming that a continuous presentation is desired, a new frame must be available at the renderer at the time when the renderer is done outputting the last available frame. The reserve is the amount of time that a graph has before a new data frame needs to be available at a renderer module. The reserve also serves as a run-time indicator to show how far the graph is from under-running. Time manager 142 keeps track of the amount of reserve available while using the relatively small frame size with periodic measurements. If the periodic measurements show that the probability of having an underrun condition with an increased frame size is acceptably low, the frame size is increased via flow manager 136. FIG. 7 illustrates this embodiment.

In FIG. 7, a capture module 300 is connected to a renderer module 304 via a rate matcher module 302. For purposes of explanation, the graph of FIG. 7 has a maximum latency requirement of 10 ms. Graph manager 134 decides to start with initial frame size of 4 ms. Segment $A_1B_1$ (0 . . . 4 ms) shows the capturing of the first frame by capture module 300. Point $C_1$ shows that first frame is output by the rate matcher module 302 at 6 ms. Segment $D_1E_1$ shows that the renderer module 304 renders the first frame during the 10 to 14 ms segment. Note that the decision to start rendering the first frame at 10 ms is based upon the maximum latency requirement of 10 ms. Segment $A_2B_2$ (4. . . 8 ms) shows the capturing of the second frame. Point $C_2$ shows that second frame is output by the rate matcher 302 at 9.5 ms. So, the reserve at the second frame is 14–9.5=5.5 ms as indicated at 306.

In order to detect when the graph is close to under-running, watchdog points in the graph are enabled to provide notification to the graph manager 134. If graph manager 134 just requests the renderer module 304 to report the time difference between the newly arrived frame and the current presentation time, then it could be too late for the graph manager 134 to take any corrective steps, such as decreasing the frame size, when this new frame arrives too close to the completion of the rendering of current frame. A better way is to anticipate an under-run problem before it occurs by adaptively setting a maximum allowed time window (e.g., a timeout) that the rate matcher module 302 has to process the data frame. This is shown in FIG. 7 during the fourth data frame propagation. The watchdog monitoring is turned on at the rate matcher module 302 by simply requesting a timeout notification, starting when the rate-matcher module 302 begins working on a data frame. This point is indicated as 308 in FIG. 7. If the rate-matcher module 302 is done processing the data frame, then it disables the watchdog timer as indicated at 310 to eliminate unnecessary signaling overhead. However, if the rate-matcher module 302 is not done processing the data frame before the watchdog interval expires, then the graph manager 134 is notified up by rate matcher's timeout 312. The graph manager 134 realizes that there is a potential for under-run and looks at graph parameters such as the related queue times (the depths of filters queues), data frame sizes, history of the rate-matching, reserve, and graph latencies. Graph manager 134 then decides what corrective action to take. Possible corrective actions include changing the data frame sizes, flushing partially filled frames, sample degradation, quality degradation, computation degradation, and skipping ahead a specified delta in the data stream. In FIG. 7, for example, the graph manager could command capture module 300 to flush the capture queue at 314 to provide the renderer module 302 with a partially filled frame to avoid under-running the graph.

In more complex graphs having multiple data stream paths that need to be rendered in synch, the data streams may have different latencies from a capture module to a data stream's corresponding renderer. To account for these different latencies at start-up, graph manager 134 derives an amount of data that each renderer in a graph should pre-roll. This amount of data is based upon the latency requirements of the graph, synchronization tolerances, and other graph-wide data flow requirements. Graph manager 134 then commands each renderer module to pre-roll a corresponding amount of data and implements a graph-wide handshake protocol where each renderer module reports to the graph manager 134 that it has pre-rolled the required amount of data. The graph manager 134 then commands a master renderer module to start playing the data and the slave renderers slave their presentation rate with the master presentation clock, resulting in all of the data streams being played in synch.

To achieve graph specific goals, graph manager 134 has many methods to move the variable amounts of data through parts of a graph. In one embodiment, control manager 138 dynamically builds clusters of data frames transparently from underlying modules in a graph. A cluster is a set of successive data frames. For purposes of explanation, the graph of FIG. 7 will be used with a cluster of data frames up to 10 ms long using data frames of 2 ms. The size of the cluster is decided after capturing by the capture module 300 is started and can be 2, 4, 6, 8, or 10 ms long. The cluster of data frames is output by the capture module 300 after all the data frames in the cluster are filled. When graph manager 134 is notified up by rate matcher's timeout 312, the graph manager 134 signals the capture module 300 via control manager 138 to flush the cluster that the capture module 300 is currently processing. Capture module 300 then releases as many data frames that it has filled so that those data frames can be processed by the next module in the graph, rate matcher 302. If the rate matcher 302 processes its cluster of data frames within the timeout period, then the capture module 300 continues to fill data frames with captured data until a cluster is built and the cluster is then sent as one frame to the next module in the graph. This use of clusters results in a low transport overhead while achieving a low latency graph.

In an alternative embodiment to move the variable amounts of data through parts of a graph to achieve low latency and low overhead, time manager 142 keeps track of the amount of reserve available for each data frame cycle through the graph. Control manager 138 can then command the frame size to be changed every frame cycle.

In another alternative embodiment to move the variable amounts of data through parts of a graph to achieve low latency and low overhead, frame sizes are kept constant. The frame size is selected based upon the timing information and requirements of the graph. This information and requirements includes the maximum latency of a stream through the graph, the timing preferences of modules in the graph, and whether any of the modules support frame flushing.

Once a graph is defined, the graph must be controlled. Another aspect of the invention is the analysis of the graph and the synthesis of the graph control solution. The graph control solution involves graph data flow and graph control and synchronization. Graph data flow involves pipe boundaries and pipe content. Graph control and synchronization involves control interfaces, time domains, clocks, data identification using time stamps and corresponding clocks and time correlation tables, presentation synchronization using presentation clocks and time translations and multiple synchronization methods, rate matching, data flow control from a static implementation with limiting the number of frames in circulation to dynamic and adaptive implementations, requirements such as low latency and high quality, low overhead solutions, and techniques such as variable frame sizes, just-in-time frame flushing, sampling, quality, and computation degradation control.

Figure 8:
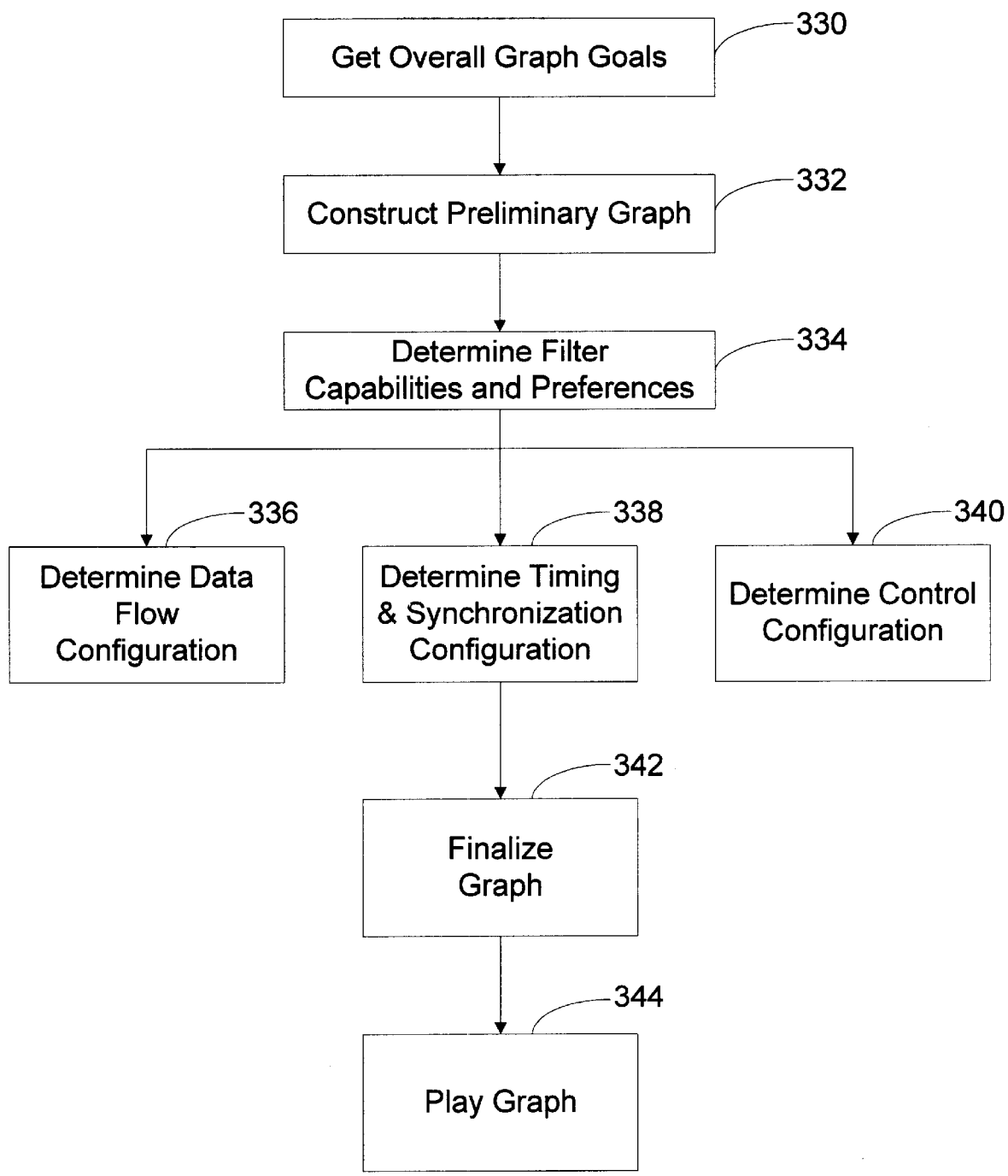
FIG. 8 is a flowchart of a method for analyzing a graph and synthesizing a graph control solution.

In one embodiment as illustrated in FIG. 8, the steps taken in the analysis of the graph and the synthesis of the graph control solution involve first obtaining the requested goals of the graph (step 330). A preliminary graph is then constructed (step 332). After a preliminary graph has been constructed, information about the modules in the graph is obtained (step 334). This includes each module's capabilities and preferences in both the hardware and the software portion of the module. Next, a graph-wide control solution is derived by determining the graph's data flow configuration (step 336), the graph's timing and synchronization configuration (step 338), and the graph's control configuration (step 340). Note that FIG. 8 shows that the configurations are determined simultaneously. It should be appreciated that the configurations could also be determined serially. Once the configurations are determined, any changes that were made to the graph are finalized (step 342) and the graph is ready to be played (step 344).

Part of the information about modules obtained is each modules capabilities and limitations. Some modules have capabilities such as the pins of a module having a frame time range [min time, max time] such as a capture module setting the minimum frame time range limit to 1 ms. Modules may support time-based processing (e.g. input 5 ms worth of data). Module pins may allow sub-framing such as a silence compressor module which receives a frame of audio data at its input pin, parses the data to skip silent periods, and then passes the non-silent segments to a downstream module via its output pin. Modules may repackage frames (e.g., any filter familiar with data formats) or may not understand the media data format. A pin of a module may stream a variable rate of data within a range [min rate, max rate] such as a MIDI module. A module may just be a transport with fixed packet size ranges and bandwidth such as RCA (CoNDIS Raw Channel Access) is for Network Transport. A module may capture/render data with its own clock or may do rate matching at a certain cost. Pins may stream data in isochronous mode with fixed rate such as pins supporting the Universal Serial Bus (USB) specification. Pins may have some hardware FIFO (First In—First Out) associated delay.

Figure 9:
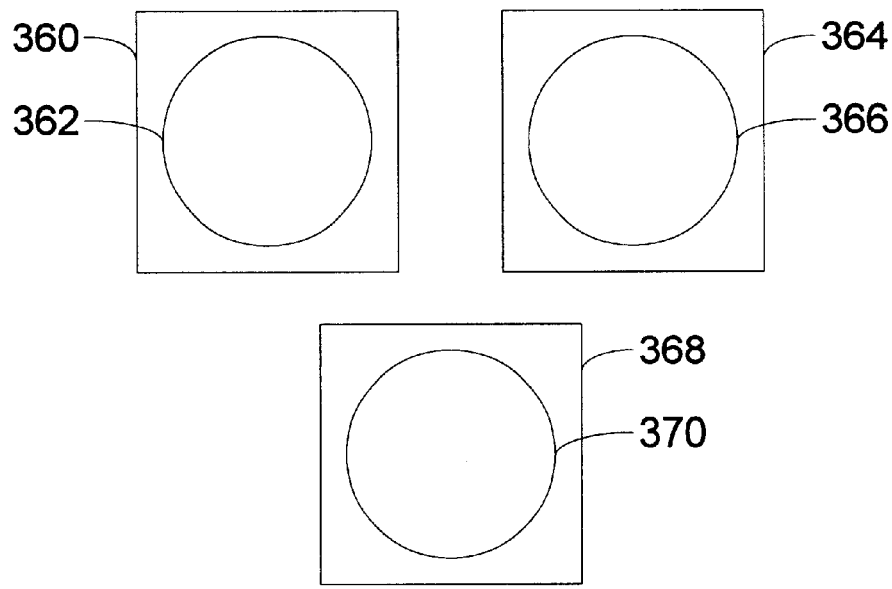
FIG. 9 is a diagram illustrating possible ranges of solution for the data flow configuration, the timing and synchronization configuration, and the control configuration of a graph.

Each area of control has its own range of potential solutions for a graph as indicated in FIG. 9. In FIG. 9, the flow manager 136 has a possible range of solutions 360 that can be used within the graph. Likewise, control manager 138 has a possible range of solutions 364 that can be used and timing manager 142 has a possible range of solutions 370 that can be used within the graph. Once filter capabilities and unique requirements such as low latency, high quality, low overhead, and special techniques are taken into consideration, the possible range of solutions for each area is reduced to a sub-set of possible solutions as indicated by sub-set 362 of flow solutions, sub-set 366 of timing and synchronization solutions, and sub-set 370 of control solutions. For example, a low latency requirement places restraints on how big frame sizes can be. Going through some transfer between modules may limit buffer size. Five ms of data could correspond to some number of frames. A graph having multiple clocks requires time domains and rate matcher modules may have to be inserted at points in the graph.

Figure 10:
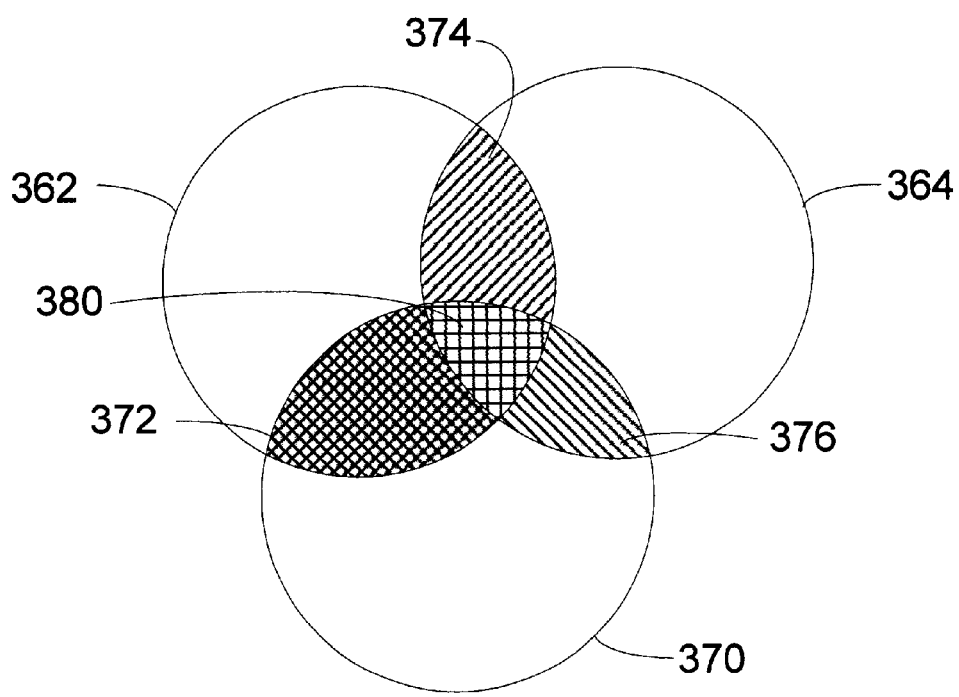
FIG. 10 is a Venn diagram illustrating a range of solutions satisfying the data flow configuration, the timing and synchronization configuration, and the control configuration of a graph.

The three configuration areas are interdependent. A change in the graph to obtain a solution in one configuration area could affect the solution in the other configuration areas. For example, an addition of a rate matcher module in a graph could change the pipe configuration of the graph. As a result, the sub-set of possible solutions will in many instances be reduced even further. FIG. 10 illustrates this interdependency. The possible range of solutions for each configuration area must fall within the possible range of solutions for other configuration areas for a solution to exist for the graph. FIG. 10 shows a solution intersection 372 between the data flow configuration sub-set 362 and control configuration sub-set 370, a solution intersection 374 between data flow configuration sub-set 362 and timing and synchronization configuration sub-set 366, and a solution intersection 376 between timing and synchronization configuration sub-set 366 and control configuration sub-set 370. In a graph having requirements where all three configurations are required, the possible range of solutions is reduced further to the solutions within the intersection 380. It should be appreciated that for some graphs, no solution exists based upon the available hardware and software modules.

For purposes of explanation, the data flow configuration, the timing and synchronization configuration, and the control configuration will be discussed separately.

To configure the data flow, a set of pipes is built by the flow manager 136. As indicated in application Ser. No. 09/310,610, pipes are dynamic software objects that define physical memory type used for frames allocation, physical bus types, frame size range, compression/expansion ratio between pipe termination points, number of frames, frame alignment, and pin weights. Within a pipe, data is merely read and written in-place into the memory controlled by an allocator, which results in the elimination of the copying of data and conversion to different frames within the pipe. For graphs that have restructuring modules that use nested frames, the approach described in application Ser. No. 09/310,596 is used. In the present invention, the concept of a pipe is extended to take into account more information when building pipes within the graph. The repackaging capabilities of modules within the graph, the capability of modules that can do sub-framing, the data format, the transport used, memory types, and frame size range restrictions based upon the medium used are taken into account in deciding pipe boundaries and the pipe content. The pipe content is the implementation of the pipe. This involves specifying a frame size of data flowing through the pipe, supporting sub-frames within a graph, which of the memory managers 106 is an allocator-implementor to allocate physical memory, and which of the memory managers 106 is an allocator-requestor to manage logical memory. It should be noted that the allocator-implementors and allocator-requestors can be implemented and exposed by a module within the graph or by a system's general purpose streaming protocol such as WDM-CSA. If the timing and synchronization configuration or the control configuration changes the graph requirements with respect to the pipe configuration, the graph is reanalyzed to determine if the pipe configuration should be changed. For example, the timing and synchronization configuration solution may require the addition of one or more rate matcher modules, which could change pipe boundaries, the pipe content, or the number of pipes in the graph.

To configure the timing and synchronization of a graph, the time manager 142 decides which modules are doing time stamping, which clock the time stamping will be based upon, where rate-matcher modules will be placed if needed, and where and how data streams required to be synchronized are synchronized using the concepts previously described. In one embodiment, decisions are also based on the following rules:

1. If a pin of a module must use its own clock (e.g. for capturing or rendering) and it doesn't accept another master clock, then this pin defines an independent time domain.
2. Two different modules connected through pins that cannot perform rate matching will belong to same time domain.
3. Any pin situated at the junction of two time domains should support rate matching.
4. Reference clocks used for synchronization purposes must expose the time according to the time domain of these clocks' clients.
5. Signal time can be translated between the time domains based on the time translation and/or time correlation tables.

To configure the control in a graph, the control manager 138 decides what flow control mechanism will be used, what events are going to be monitored, and what points in the graph will be used for monitoring. The control mechanism, events, and points are dependent on the quality and latency requirements of the graph and the control mechanisms of the modules within the graph.

For example, to provide low latency control, in one embodiment, control manager 138 performs the steps of identifying the streams to be monitored based on the graph topology and the specified latency requirements, identifies available control points, and identifies the available control mechanism. The control points may be a low reserve event notification on a renderer module or frame transport events available on modules or a combination of frame transport events and low reserve event notification. The available control mechanism may be frame flushing, frame size changes, frame clusters, sampling, quality and computation degradations. Once a graph begins running, graph manager 134 synchronizes the pre-roll of streams, measures initial latency and adjusts the initial reserve, and enables monitoring events to anticipate potential error states. If a potential error state is determined, corrective actions are taken and monitoring is extended to isolate the problem. If the graph is performing as expected, the control manager 138 further optimizes parameters such as memory usage, number and size of frames in circulation, CPU usage, and transport overhead.

Once all the modules in a graph are assembled, the control manager 138 examines all of the control components in the graph and removes any components that are unnecessary to the overall operation of the graph. The remaining components are then connected directly to each other. During step 342, commands to modules within the graph are sent. These commands are analogous to job orders in that the commands inform each module what control functions that module is to perform in the graph. For example, a module may be commanded to time stamp data using the module's own clock, a rate matcher module may be commanded to rate match with a certain rate match coefficient, and a video renderer module may be commanded to slave to another renderer in the graph.

Figure 11:
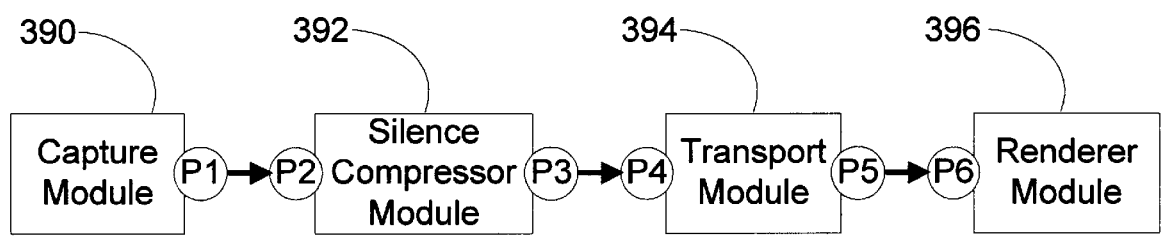
FIG. 11 is a block diagram illustrating a graph having a solution for data flow, timing and synchronization, and control.

FIG. 11 shows a graph controlled with the concepts described above. Capture module 390 is connected to renderer module 396 via silence compressor module 392 and transport module 394. For purposes of explanation, the graph requirement is selected to have a maximum latency of 10 ms and each module has limitations selected to further explain the concepts of this invention. The graph manager 134 polls the modules and determines each module's capabilities and preferences. The capture module responds that its minimum frame size is 5 ms of data, data capture is done based on its own clock, it cannot do rate matching, it supports frame flushing, and its output pin accepts any PCM audio data format with sampling frequencies of 8 kHz, 11 kHz, 22 kHz, and 44 kHz, 8/16 bit samples, mono or stereo. The silence compressor module 392 responds that it can do in-place sub-frames splitting, can do frame repackaging, its input pin accepts the same format as the capture module's output pin without restriction, and its output pin accepts PCM with frequencies of 8 kHz, 11 kHz, 22 kHz, and 44 kHz with each frequency related to the same frequency format available on its input pin. The transport module 394 indicates that it's maximum frame size is 500 bytes, that it doesn't understand the media formats, and it can do in-place forwarding. The renderer module 396 responds that it can do rate matching, renders the data stream based on its own clock, can provide a "low reserve" event (e.g., timeout notification), and accepts the same PCM format without restrictions.

To determine the pipe configuration, limitations on pins are found. The transport module 394 limits the frame size to 500 bytes or less on its own connections, pin P4 and pin P5 in FIG. 11. All other pins do not have frame size transport limitations. A minimum frame size of 5 ms in a 44 kHz 16 bit stereo format will translate into 0.005 s*44,100 Hz*2*(16 bits/8 bytes)=882 bytes. The pipe configuration will be one pipe with frames of 882 bytes or more for the segment between pins P1 and P2 and one pipe with framies of 500 bytes or less for the segments between pin P3 and P6.

To determine the timing and synchronization configuration, the modules indicated that there are two independent clocks. One is exposed by the capture module's output pin P1 and the other clock is exposed by the renderer module's input pin P6. This means that there are two time domains with each clock being the basis for its own time domain. Since neither pin P1 or P2 support rate matching, the silence compressor module 392 belongs to the same time domain as the capture module 390. The transport module 394 belongs to the same time domain as the silence compressor module 392 because neither of pins P3 or P4 support rate matching. Pin P5 does not support rate matching, but pin P6 does. Pin P6 is selected as the rate-matcher between time domains and pin P5 belongs to the same time domain as pin P4.

To determine the control configuration, the maximum latency restriction requires that an adaptive control mechanism be used. No data pre-roll synchronization or stream synchronization is required because there is only one stream in the graph. The control manager 138 determines that the "low reserve" event supported by the renderer module 396 is the least intrusive way to detect when there is a potential for under-running. Frame transport events on the silence compressor module's pins and queue depth can be used to identify possible problems. The capture module 390 supports frame flushing, so frame flushing can be used as a corrective action for "low reserve" events. An initial frame size of 882 bytes, corresponding to the minimum frame time range size of 5 ms at 44 kHz, is chosen to have a sufficient reserve time when the graph starts running. Control manager 138 commands capture module 390 to indicate when a frame is sent and renderer module 396 to indicate when a frame is received in order to measure a data frame's propagation latency through the graph. When a client commands the graph to be played, graph manager 134 commands the modules to begin processing data.

While the graph is playing, graph manager 134 measures the propagation latency and determines the reserve. If there is sufficient reserve available, a larger frame size can be used. The graph manager 134 commands the renderer module 396 to signal a "low reserve" event while the graph is being played. If the renderer module 396 signals a "low reserve" event, graph manager 134 commands the capture module 390 to flush the data frame currently being captured and commands the silence compressor 392 to signal frame transport events on the silence compressor's pins to isolate the glitch cause. In one embodiment, the graph manager 134 looks at a real time log of streaming events to isolate the glitch. This real time log consists of time stamped events, such as frame capturing, rendering, frame arrival, frame processing, transfer events, low-reserve, and timeout events. Graph manager 134 will reduce data frame sizes if propagation delays caused by processing a large data frame caused the "low reserve" situation. If no corrective actions can be taken to eliminate the "low reserve" event, graph manager 134 indicates to the client that requested the graph to be played that a failure has occurred and possible reasons for the failure.

All of the references cited herein, including patents, patent applications, and publications, are hereby incorporated in their entireties by reference.

The present invention improves the flow of streaming data through a graph. In view of the many possible embodiments to which the principles of this invention may be applied, it should be recognized that the embodiment described herein with respect to the drawing figures is meant to be illustrative only and should not be taken as limiting the scope of invention. For example, those of skill in the art will recognize that the elements of the illustrated embodiment shown in software may be implemented in hardware and vice versa or that the illustrated embodiment can be modified in arrangement and detail without departing from the spirit of the invention. Therefore, the invention as described herein contemplates all such embodiments as may come within the scope of the following claims and equivalents thereof.

We claim:

1. A method for synchronizing a plurality of streaming data paths through a plurality of modules in a graph, each of the plurality of modules having at least one pin, the method of synchronizing comprising the steps of:

determining a number of time domains in the system;

assigning each pin of the plurality of modules to one of the number of time domains; and selecting a synchronization algorithm to synchronize the plurality of streaming data paths streaming through said number of time domains.

2. The method of claim 1 wherein the graph has at least one clock, the step of determining a number of time domains comprises:

setting the number of time domains equal to a number of independent clocks within the graph.

3. The method of claim 1 wherein the step of assigning a pin to a time domain comprises:

if a first pin of one of the modules exposes a first clock:
assigning the first pin to a first time domain defined by the first clock; and
for each of the other pins of the one of the modules that is not independent of the first pin, assigning the other pin to said first time domain.

4. The method of claim 3 wherein the step of assigning a pin to a time domain further comprises:

assigning each pin of other modules that is connected to the first pin to the first time domain if the pin does not belong to a time domain.

5. The method of claim 4 wherein the step of assigning a pin to a time domain further comprises:

if a second pin connected to the first pin belongs to a second time domain:
merging the first time domain and the second time domain into a master time domain if one of the first clock and a second clock exposed by the second time domain can slave to the other of the first clock and the second clock.

6. The method of claim 5 wherein the step of assigning a pin to a time domain further comprises:

inserting a rate matcher module between the first pin and the second pin if neither of the first clock and the second clock can slave to the other of the first clock and the second clock.

7. The method of claim 3 wherein the step of assigning a pin to a time domain further comprises:

assigning each pin of other modules to the first time domain for each pin of the plurality of modules that does not belong to a time domain and that can be independent of the first pin.

8. The method of claim 1 further comprising the steps of:

identifying at least one bridging module that bridges at least two time domains; and determining how each of said at least one bridging module rate matches a data stream crossing between said at least two time domains.

9. The method of claim 8 wherein a clock defines each time domain, the step of determining how at least one bridging module rate matches a data stream crossing between said at least two time domains comprises:

creating a time correlation table for the clocks defining said at least two time domains;

controlling rate matching coefficients used by the at least one bridging module based on a relative progression of the clocks in said at least two time domains.

10. The method of claim 1 wherein the step of selecting a synchronization algorithm comprises:

determining whether the plurality of streaming data paths will be slaved to a master data stream.

11. The method of claim 10 wherein if slaving the plurality of streaming data paths to a master data stream is chosen:

selecting one of the plurality of streaming data paths to be the master data stream; and slaving the other of the plurality of streaming data paths to the master data stream.

12. The method of claim 11 further comprising the steps of:

determining at least one synchronization point in the graph; and for each synchronization point:
determining a master clock to slave to; and
processing data samples on said synchronization point's data stream when a timestamp of the data samples satisfies a pre-determined relation to the master clock.

13. The method of claim 12 wherein each synchronization point belongs to a slave time domain having a first clock, said master data stream belongs to a master time domain having a master clock, said master time domain being different from said slave time domain, the step of slaving the plurality of streaming data paths to the master data stream further comprises the steps of:

for each synchronization point in a slave time domain that slaves to a master clock:
building a presentation clock that translates a time of said master clock into the slave time domain.

14. The method of claim 13 wherein the step of building a presentation clock comprises:

identifying a sequence of time domains between the slave time domain and the master time domain, said sequence having at least one junction point, said junction point being a point between two adjacent time domains; and associating a translation table with each of said at least one junction point, said translation table having information about a relationship between timestamps of data samples in the two adjacent time domains.

15. The method of claim 14 further comprising the step of translating a master clock time value to a slave time value in said slave time domain using the information in each translation table between said slave time domain and said master time domain.

16. The method of claim 1 wherein the step of selecting a synchronization algorithm comprises:

determining whether the plurality of streaming data paths will be slaved to a master clock.

17. The method of claim 16 further comprising the steps of:
if the plurality of streaming data paths will be slaved to a master clock:
determining at least one synchronization point in the graph; and
for each synchronization point in the graph:
determining a master clock to slave to; and
processing data samples on said synchronization point's data stream when a timestamp of the data samples satisifies a pre-determined relation to said master clock.

18. The method of claim 17 wherein each synchronization point has a time domain clock, the method for synchronizing the plurality of streaming data paths further comprises:
for each synchronization point:
defining a time correlation table, said time correlation table having corresponding values for the master clock time and the synchronization point's time domain clock with a predefined granularity; and
using said time correlation table to translate between the synchronization point's time domain clock time and master clock time in order to satisfy said pre-determined relation to the master clock.

19. The method of claim 1 wherein the graph has at least one capture module to capture data, at least one renderer module connected to one of the at least one capture modules, and a master renderer associated with a presentation clock, the method of synchronizing further comprising the step of:
for each of the streaming data paths:
pre-rolling a selected amount of data through the streaming data path;
detecting that the selected amount of data has been pre-rolled; and commanding the master renderer to start playing the data after detecting that the selected amount of data has been pre-rolled in each streaming data path.

20. A computer-readable medium having computer-executable instructions for performing steps to control a graph to have a latency below a pre-determined maximum latency, the graph having at least one capture module for capturing data in data frames connected to at least one renderer module for rendering the data frame, the steps comprising:
setting a size of a data frame for the at least one capture module to capture data into the data frame;
detecting the time the data in the data frame is rendered;
detecting when there is a potential for the at least one renderer module to run out of data; and
taking at least one corrective step to prevent the at least one renderer module from running out of data.

21. The computer-readable medium of claim 20 wherein the step of detecting when there is a potential for the at least one renderer to run out of data comprises:
starting a timeout interval on at least one module, the timeout interval being the maximum allowed time the at least one module has to process the data in the data frame; and
receiving notification if the at least one module is processing the data after the timeout interval has elapsed.

22. The computer-readable medium of claim 21 further comprising the steps of:
determining a reserve time, the reserve time being equivalent to an amount of time that a frame of data has to be made available at the one of the at least renderer module; and adjusting the timeout interval to a time interval such that there is sufficient reserve time to allow the at least one corrective step to be taken.

23. The computer-readable medium of claim 22 wherein the amount of time that a frame of data has to be made available is determined by an amount of time worth of buffered data frames available at the one of the at least renderer module.

24. The computer-readable medium of claim 20 wherein the step of setting a size of data to be captured in a data frame comprises the steps of:
setting a data frame size to a first size, the first size'small enough to ensure that the latency is below the pre-determined maximum latency and that there is a sufficient reserve time, the reserve time being equivalent to an amount of time that a new frame of data has to be available at the at least one renderer module;
tracking the reserve time while at least one frame of data of the first size is processed by the graph; and
increasing the data size to a second size if there is sufficient reserve time to allow the at least one corrective step to be taken.

25. The computer-readable medium of claim 20 wherein the step of taking at least one corrective step comprises selecting at least one of changing the data size, changing a rate that at least one renderer module is rendering data, sample degradation, quality degradation, computation degradation, and skipping ahead a pre-determined time in the data stream.

26. The computer-readable medium of claim 20 wherein the at least one capture module captures data in a cluster of frames, the step of taking at least one corrective step comprises signaling the at least one capture module to send as many data frames it has available without waiting for the cluster of frames to be filled.

27. A computer-readable medium having computer-executable instructions for performing steps to control a graph, the graph having a number of modules for processing data, the steps comprising:
determining a timing configuration;
determining a data flow configuration;
determining a control configuration;
informing each of the number of modules what control functions that module is to perform in the graph; and
commanding the number of modules to process the data in response to an external command to play the graph.

28. The computer-readable medium of claim 27 wherein the step of determining a data flow configuration comprises:
determining at least one pipe boundary; and
determining at least one pipe content.

29. The computer-readable medium of claim 28 wherein the step of determining at least one pipe content comprises:
specifying a frame size of data flowing through the pipe;
specifying a memory manager to allocate physical memory; and
specifying a memory manager to manage logical memory.

30. The computer-readable medium of claim 29 wherein the step of determining at least one pipe content further comprises specifying a physical memory type.

31. The computer-readable medium of claim 27 wherein the step of determining a timing configuration comprises:
determining a time domain configuration;
commanding at least one module to time stamp the data; and if the number of time domains is at least two:
selecting at least one synchronization location; and
selecting at least one synchronization algorithm.

32. The computer-readable medium of claim 31 further comprising the step of:
selecting at least one clock for the at least one module to use as a basis for time stamping.

33. The computer-readable medium of claim 31 further comprising the step of commanding at least one module to rate match between each time domain.

34. The computer-readable medium of claim 31 wherein the step of selecting at least one synchronization location comprises:
determining at least one module having at least one rendering pin to render the data; and
selecting the at least one rendering pin to be the at least one synchronization location.

35. The computer-readable medium of claim 31 wherein the step of selecting at least one synchronization algorithm comprises the steps of:
determining whether the graph has a plurality of streaming data paths; and
if the graph has a plurality of streaming data paths:
determining whether the plurality of streaming data paths will be slaved to a master data stream.

36. The computer-readable medium of claim 35 wherein if the the plurality of streaming data paths will be slaved to a master data stream:
selecting one of the plurality of streaming data paths to be the master data stream; and
slaving the other of the plurality of streaming data paths to the master data stream.

37. The computer-readable medium of claim 36 further comprising the steps of:
determining at least one synchronization point in the graph; and
for each synchronization point:
determining a master clock to slave to; and
processing data samples on said synchronization points' data stream when a timestamp of the data samples satisfies a pre-determined relation to the master clock.

38. The computer-readable medium of claim 37 wherein each synchronization point belongs to a slave time domain having a slave clock, said master data stream belongs to a master time domain having a master clock, said master time domain being different from said slave time domain, the step of slaving the plurality of streaming data paths to a master data stream further comprises the step of:
for each synchronization point in a slave time domain that slaves to a master clock:
building a presentation clock that translates a time of said master clock into the slave time domain.

39. The computer-readable medium of claim 38 wherein the step of building a presentation clock comprises:
identifying a sequence of time domains between the slave time domain and the master time domain, said sequence having at least one junction point, said junction point being a point between two adjacent time domains; and
associating a translation table with each of said at least one junction point, said translation table having information about a relationship between timestamps of data samples in the two adjacent time domains.

40. The computer-readable medium of claim 39 further comprising the step of translating a master clock time value to a slave time value in said slave time domain using the information in each translation table between said slave time domain and said master time domain.

41. The computer-readable medium of claim 31 wherein the step of selecting at least one synchronization algorithm comprises the steps of:
determining whether the graph has a plurality of streaming data paths; and
if the graph has a plurality of streaming data paths:
determining whether the plurality of streaming data paths will be slaved to a master clock.

42. The computer-readable medium of claim 41 further comprising the steps of:
if the plurality of streaming data paths will be slaved to a master clock:
determining at least one synchronization point in the graph; and
for each synchronization point:
determining a master clock to slave to; and
processing data samples on said synchronization point's data stream when a timestamp of the data samples satisifies a pre-determined relation to said master clock.

43. The computer-readable medium of claim 42 wherein the step of slaving a plurality of streaming data paths to a master clock further comprises:
for each synchronization point:
defining a time correlation table, said time correlation table having corresponding values for the master clock time and the synchronization point's time domain clock with a predefined granularity; and
using said time correlation table to translate between the synchronization point's time domain clock time and master clock time in order to satisfy said pre-determined relation to the master clock.

44. The computer-readable medium of claim 31 wherein the step of determining a time domain configuration comprises assigning modules and pins of modules located within the graph to at least one of a number of time domains.

45. The computer-readable medium of claim 44 wherein the step of assigning modules and pins of modules comprises:
assigning a first pin of a first module to a first time domain if the pin must use its own clock and can not accept another clock;
assigning each pin connected to the first pin to the first time domain if each pin connected to the first pin is not assigned to an other time domain;
assigning at least one pin belonging to a module connected to the first pin through at least one other pin to the first time domain if the at least one module cannot perform rate matching between its pins; and
assigning each pin of each module to the first time domain for each pin of each module that does not belong to an other time domain and that can be independent of the first pin.

46. The computer-readable medium of claim 27 wherein the step of determining a control configuration comprises:
determining a flow control mechanism to be used;
determining events to be monitored; and
identifying points in the graph to be used for monitoring.

47. The computer-readable medium of claim 46 wherein the flow control mechanism to be used is dependent upon capabilities of modules within the graph.

48. The computer-readable medium of claim 46 wherein the step of determining a flow control mechanism comprises:

determining if at least one module in the graph has a frame flushing capability for supporting a frame flushing control;

determining if at least one module in the graph can flush partially filled data frames for supporting a partially filled frame flushing control;

determining if at least one module in the graph has a frame size limitation that provides a limitation to a frame size change control; and selecting at least one of the frame flushing control and the partially filled frame flushing control and the frame size change control for taking corrective action when a low reserve event notification is received.

49. The computer-readable medium of claim 46 wherein the graph has a topology, the step of determining events to be monitored comprises:

identifying data streams to be monitored based upon the graph topology and quality and latency requirements of the graph; and selecting events within the identified data streams to monitor at least one parameter that affects the quality and latency requirements of the graph.

50. The computer-readable medium of claim 46 wherein the step of identifying points in the graph to be monitored comprises:

determining, for each renderer module within the graph, if the renderer module supports low reserve event notifications;

determining, for each module within the graph, frame transport events supported by the module.

51. The computer-readable medium of claim 27 wherein the step of playing the graph comprises:

determining an amount of data that each renderer in a data stream to be synchronized should pre-roll;

starting the graph;

determining a reserve for each data stream;

adjusting a data frame size to achieve a desired reserve;

enabling monitoring events to anticipate potential problems; and taking corrective action when a potential problem is anticipated.

52. The computer-readable medium of claim 51 further comprising the step of optimizing at least one parameter while the graph is running.

53. The computer-readable medium of claim 52 wherein the step of optimizing at least one parameter comprises optimizing memory usage.

54. The computer-readable medium of claim 52 wherein the step of optimizing at least one parameter comprises optimizing a number of data frames in circulation within the graph.

55. The computer-readable medium of claim 52 wherein the step of optimizing at least one parameter comprises optimizing the size of data frames.

56. The computer-readable medium of claim 52 wherein the step of optimizing at least one parameter comprises optimizing CPU usage.

57. The computer-readable medium of claim 52 wherein the step of optimizing at least one parameter comprises optimizing transport overhead.

58. The computer-readable medium of claim 51 wherein the data is processed in data frames, the step of taking a corrective action comprises commanding at least one module within the graph to flush data frames the at least one module is processing.

59. The computer-readable medium of claim 51 wherein the data is processed in data frames, the step of taking a corrective action comprises commanding at least one module within the graph to flush partially filled data frames the at least one module is processing.

60. The computer-readable medium of claim 51 wherein the data is processed in data frames having a size, the step of taking a corrective action comprises selecting at least one of changing a rate that at least one renderer module is rendering data, commanding at least one module to change the data frame size, sample degradation, quality degradation, computation degradation, and skipping ahead a predetermined amount of time in the data stream.

* * * * *

UNITED STATES PATENT AND TRADEMARK OFFICE
CERTIFICATE OF CORRECTION

PATENT NO. : 6,594,773 B1  
DATED : July 15, 2003  
INVENTOR(S) : Lisitsa et al.

It is certified that error appears in the above-identified patent and that said Letters Patent is hereby corrected as shown below:

<u>Title page,</u>  
Item [56], References Cited, OTHER PUBLICATIONS, "102.htm" should read -- 012.htm --.

<u>Column 11,</u>  
Line 66, "215" should read -- 216 --.

<u>Column 24,</u>  
Line 12, "size'small" should read -- size small --.

Signed and Sealed this

Twenty-seventh Day of July, 2004

JON W. DUDAS  
*Acting Director of the United States Patent and Trademark Office*